United States Patent [19]

Webb et al.

[11] Patent Number: 5,694,617
[45] Date of Patent: Dec. 2, 1997

[54] SYSTEM FOR PRIORITIZING QUIESCE REQUESTS AND RECOVERING FROM A QUIESCENT STATE IN A MULTIPROCESSING SYSTEM WITH A MILLI-MODE OPERATION

[75] Inventors: Charles Franklin Webb, Poughkeepsie; Janet Rhea Easton, Woodstock; Mark Steven Farrell, Pleasant Valley, all of N.Y.; Ming H. Cheung, Cape Girardeau, Mo.

[73] Assignee: International Business Machines Corporation, Armonk, N.Y.

[21] Appl. No.: 414,975

[22] Filed: Mar. 31, 1995

[51] Int. Cl.$^6$ .............................. G06F 11/00; G06F 13/00
[52] U.S. Cl. .................. 395/860; 395/737; 395/859; 395/182.13; 395/200.01; 395/800; 340/825.09
[58] Field of Search ..................... 395/200.01, 860, 395/737, 182.13, 182.21, 729, 733, 859, 800, 284; 340/825.09

[56] References Cited

U.S. PATENT DOCUMENTS

| | | |
|---|---|---|
| 4,059,851 | 11/1977 | Nutter et al. . |
| 4,332,027 | 5/1982 | Malcolm et al. . |
| 4,386,400 | 5/1983 | Cope et al. . |
| 4,503,535 | 3/1985 | Budde et al. . |
| 4,611,297 | 9/1986 | Dudley et al. . |
| 4,807,223 | 2/1989 | Wells . |
| 4,901,233 | 2/1990 | Liptay et al. . |
| 4,970,640 | 11/1990 | Beardsley et al. ................. 395/284 |
| 4,974,147 | 11/1990 | Hanrahan et al. ................. 395/182.22 |
| 5,226,164 | 7/1993 | Nadas et al. ....................... 395/800 |
| 5,230,044 | 7/1993 | Cao et al. . |
| 5,265,223 | 11/1993 | Brockmann et al. . |
| 5,280,593 | 1/1994 | Bullions, III et al. .............. 395/384 |
| 5,301,282 | 4/1994 | Amini et al. . |

OTHER PUBLICATIONS

IBM/TDB vol. 35 No. 4A, Sept. 1992, "Milli-Code", Bullions et al., pp. 451–454.

*Primary Examiner*—Jack B. Harvey
*Assistant Examiner*—Ario Etienne
*Attorney, Agent, or Firm*—Lynn L. Augspurger; Laurence J. Marhoefer

[57] ABSTRACT

A milli-mode routine handles a quiesce interrupt, and causes all the processors in the system to enter a quiesced state. A single bit of a millicode control register indicates a quiesced state and drives an output of the processor to indicate the processor is in a quiesced state. The processor receives a signal indicating all processors in the system are in a quiesced state and latches this value. The output of this latch is sent to the processor instruction unit for use as a millicode branch condition.

3 Claims, 4 Drawing Sheets

SYSTEM FOR PRIORITIZING QUIESCE REQUESTS AND RECOVERING FROM A QUIESCENT STATE IN A MULTIPROCESSING SYSTEM WITH A MILLI-MODE OPERATION

CROSS REFERENCE TO RELATED APPLICATIONS

The present United States patent application is related to the following copending United States patent applications, which are assigned to the assignee of the present application, and which are incorporated herein by reference.

Application Ser. No. 08/414,154, filed Mar. 31, 1995, entitled "Specialized Millicode Instruction."

Application Ser. No. 08/414,821, filed Mar. 31, 1995, entitled "Millicode Read-Only Storage With Entry Point Patch Control."

Application Ser. No. 08/414,977, filed Mar. 31, 1995, entitled "Hardware Retry Trap for Millicoded Processor"

Application Ser. No. 08/414,158, filed Mar. 31, 1995, entitled "Addressing Extended Memory Using Millicode."

Application Ser. No. 08/414,812, filed Mar. 31, 1995, entitled "Mapping Processor State Into A Millicode Addressable Processor State Register Array."

Application Ser. No. 08/414,164, filed Mar. 31, 1995, entitled "Linking Program Access Register Number With Millicode Operand Access."

BACKGROUND OF THE INVENTION

1. Field of the Invention

This invention relates to improvements in pipelined computer processor systems which execute simple instructions in hardware controlled execution units and execute complex instructions with vertical microcode (i.e. millicode) routines in the same hardware controlled execution units; a milli-mode operation. More particularly, this invention relates to a system for prioritizing quiescent requests and recovering from the quiescent state in a multi-processor system with milli-mode operation and in which error detection is based on parallel execution units generating the same result.

2. Description of the Prior Art

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

A quiescent mechanism is used by a processor in a multi-processor system to force all processors in the system to stop their activity while the processor requesting the quiescent state causes some change in the system state. A general definition of what constitutes a "quiesced" state of a multi-processor system is an absence of system bus activity. At a minimum, a processor that is quiesced should not generate storage updates or control type bus commands. Line fetches are restricted but are allowed for the purpose of instruction fetching for internal code, including millicode. Such fetches are not allowed from storage which another processor might update as part of a system quiesced operation. It is possible for more than one processor to request simultaneously a quiesced state. However, only one processor at a time is allowed to change the system state. This, therefore, requires an ability of the system to prioritize multiple simultaneous quiesce requests.

In prior art multi-processor systems, two system bus commands are provided for communicating between processors regarding quiesce operations. These are: set quiesce and reset quiesce commands. The set quiesce command is issued by a processor to indicate that it wants all other processors to enter a quiesced state. The reset quiesce command is issued by the processor that previously issued the set quiesce command and has now completed the operation for which the quiesce state was requested. These commands include identification of the processor sending the command and are received and processed by all the processors in the system. Each processor generates an output signal that indicates it has entered a quiesced state. These signals are combined to form a system quiesced signal. Each processor receives this system quiesced signal, which indicates all the processors in the system are quiesced. While prior art techniques for placing the system in a quiesced state and for recovering from the quiesced state are generally satisfactory, a problem arises where there is a recovery from error operation in the midst of a quiesced request, since there is no way to know if the quiesced request is valid in a system where error detection is based upon parallel execution units generating the same result. The quiesce set or quiesce reset interrupt could be in error, but the quiesce set and quiesce reset bits are not in the retry recovery unit registers because they are asynchronous with respect to the instruction set.

An object of this invention is the provision of a relatively simple millicode sequence for handling a quiescent interrupt and for performing an operation requiring a quiesced system.

Briefly, this invention contemplates a milli-mode routine for handling a quiesce interrupt and for causing all the processors in the system to enter a quiesced state. A single bit of a millicode control register indicates a quiesced state and drives an output of the processor to indicate the processor is in a quiesced state. The processor receives a signal indicating all processors in the system are in a quiesced stated and latches this value. The output of this latch is sent to the processor instruction unit for use as a millicode branch condition (QUSYS).

Interrupt logic in the processor execution unit receives incoming set quiesce and reset quiesce commands and controls a quiesce request pending register with a bit to indicate the quiesce state of each processor in the system. When a set quiesce request is received from processor "n", bit "n" of this register is set, for example to "1". Similarly, when a reset quiesce request is received from processor "n" the bit of this register is set to "0". When any bit of this register is set indicating a quiesce request, the interrupt logic sends a quiesce interrupt pending signal to the execution unit interrupt, and the interrupt is taken when an interruptible point is reached. The quiesce interrupt pending signal is sent to the instruction unit for use as a millicode branch condition (QUREQ). The interrupt logic also includes a quiesce request priority encoder, which determines the lowest-numbered processor among those processors which have a quiesce request pending. This number is compared to the number assigned to this processor, and, when they match, a separate quiesce priority granted signal is sent to the instruction unit for use as a millicode branch condition (QUPRIO). In the event of a hardware error, all bits of the quiesce request register are set to "0" as part of the hardware retry sequence. The millicode control register bit is preserved unchanged indicating whether this processor, which indicated a hardware error, is quiesced. A retry trap provides a means for the millicode to detect that the hardware retry has been performed within a specified interval in the millicode quiesce sequence. The retry trap is a system register bit which is set to "1" whenever a hardware retry is performed. This register can be both read and written to by the millicode, and the retry trap bit is sent to the instruction unit for use as a millicode branch condition (IRETRY).

A quiesce interrupt occurs when a quiesce request is pending from one or more processors in the system and this particular processor is at an interruptible point. This interrupt condition is indicated to the millicode via the interrupt type and the millicode branch condition QUREQ.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application attorney docket P09-93-035, Ser. No. 08/149,260, filed Nov. 9, 1993, now U.S. Pat. No. 5,504,859, assigned to the assignee of this application, and also incorporated herein by reference.

Figure 1:
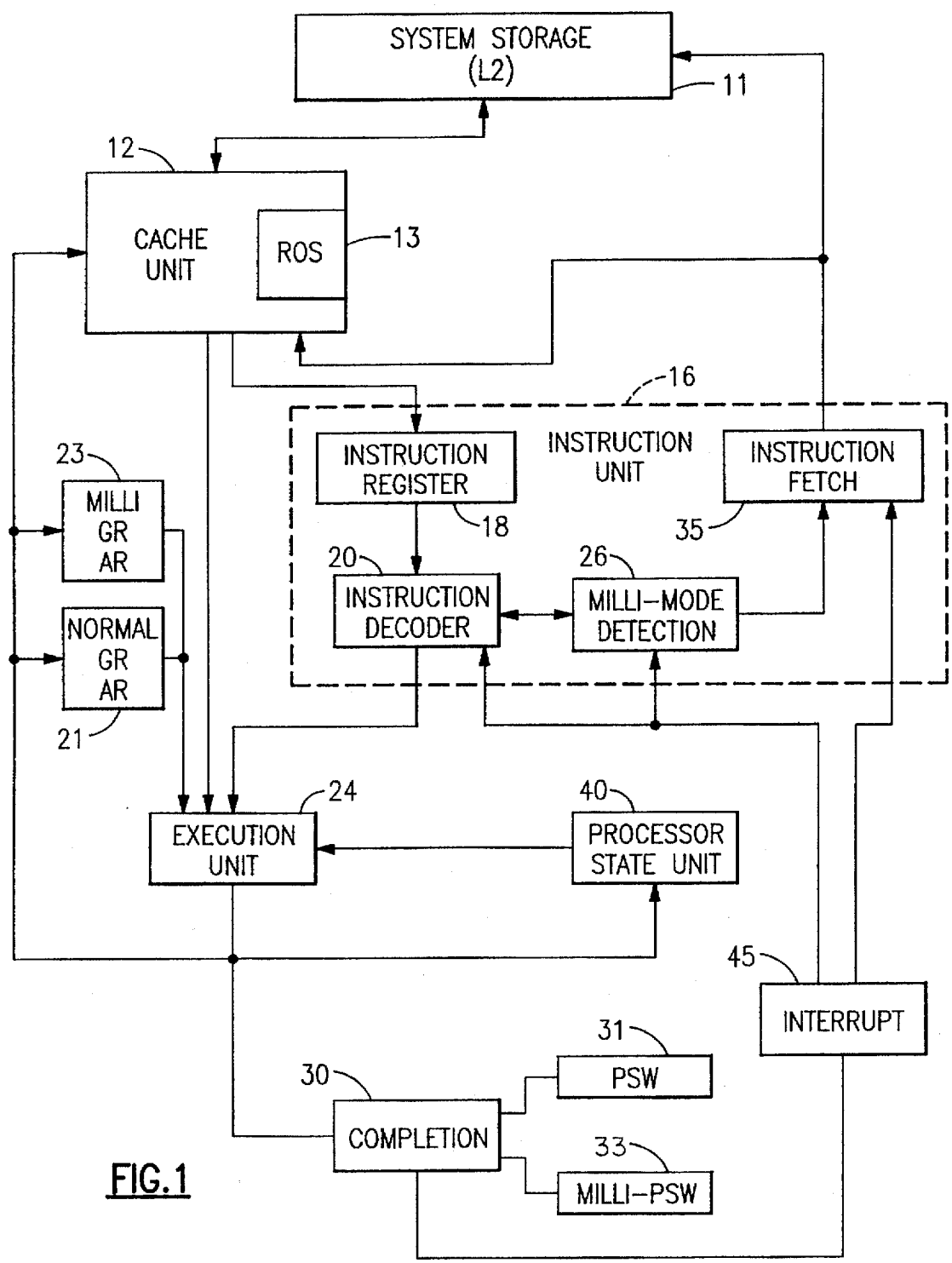
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a split cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a Mend milli-instruction. This causes the decoder to stop decoding in milli-mode. Depending on whether or not there are additional interrupts that require servicing, the decoder hardware will either redo the interrupt process or return to decoding macro-instructions from the cache.

Figure 2:
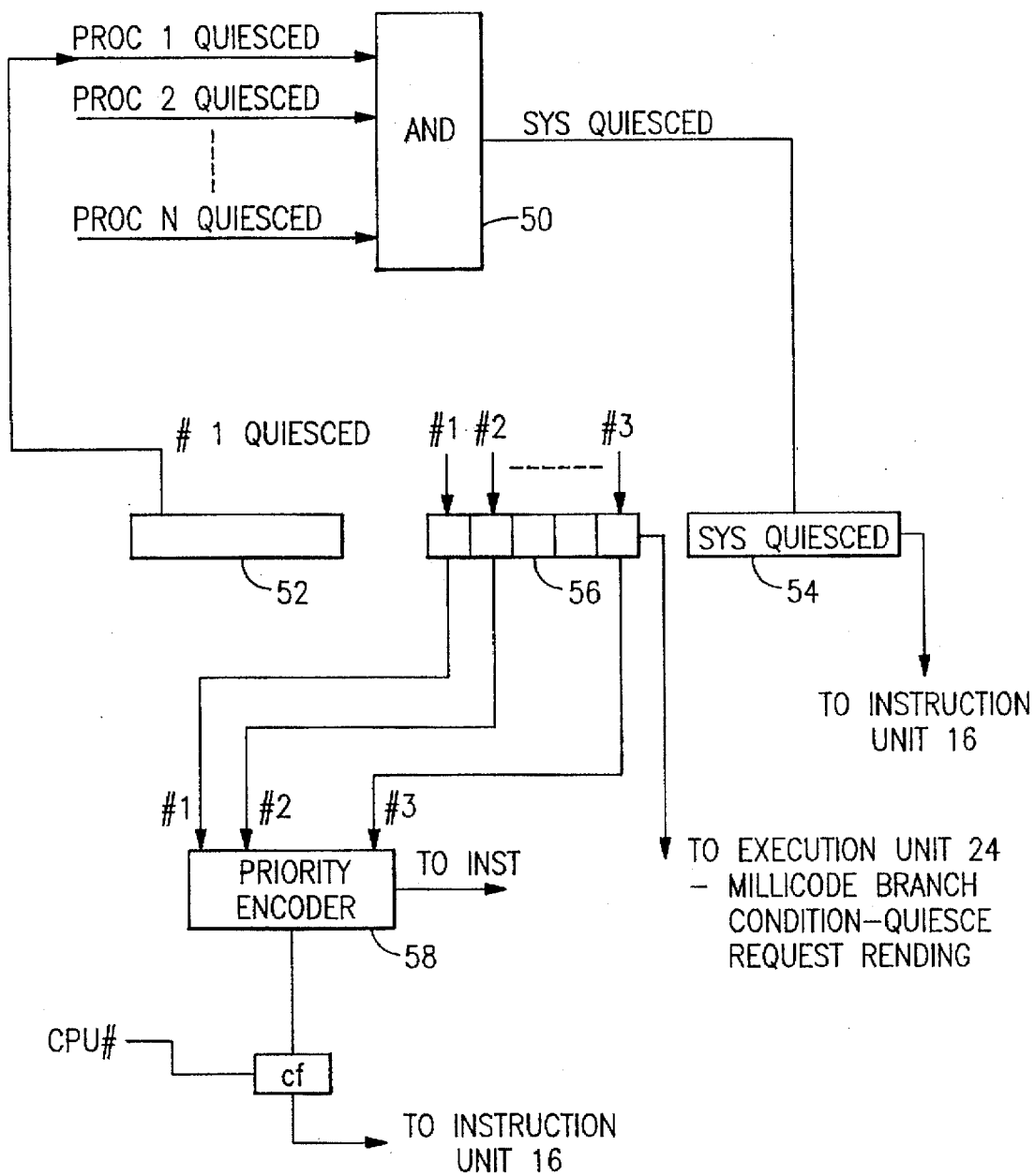
FIG. 2 is a logic diagram illustrating a component system for prioritizing quiescent requests in accordance with the teachings of this invention.

Referring now to FIG. 2, two system bus commands are provided for communications between processors regarding quiesce operations:

Set Quiesce

Reset Quiesce

Set quiesce is issued by a processor to indicate that it wants all other processors to enter a "quiesced" state. Reset quiesce is issued by a processor that has previously issued set quiesce and has now completed the operation for which the quiesced state was required. These commands must include identification (processor number) of the processor sending the command. These are received and processed by all processors in the system.

Each processor drives an output that indicates it has entered a "quiesced" state. These signals are combined via an AND circuit 50 to form a "system quiesced" signal. Each CP (herein illustrated CP #1) receives this signal, which indicates that all CPs in the system are quiesced.

One bit of a millicode control register 52 is defined as the "quiesced" state and drives the processor output pin indicating that the processor has been quiesced. This bit is fully controlled by millicode by reading and writing the millicode control register.

Each processor receives the signal indicating that all processors in the system are quiesced and latches this indication in latch 54. The output of this latch is sent to the instruction unit 16 for use as a millicode branch condition (label QUSYS).

Interrupt logic in the execution unit 24 receives incoming set quiesce and reset quiesce commands. That logic implements a quiesce request pending register 56 with one bit from each processor in the system. When a set quiesce request is received from processor <x>, bit <x> of this register will be set to '1'; similarly, when a reset quiesce request is received from processor <x>, bit <x> of this register will be set to '0'. When any bit of this register is on, the interrupt logic signals to the execution unit 24 interrupt controls that a quiesce interrupt is pending, and the interrupt is taken when an interruptible point is reached. Note that if the quiesce request is from this processor only, the request will be cleared before any interrupt is ever taken. The "quiesce interrupt pending" signal is also sent to the instruction unit 16 for use as a millicode branch condition (label QUREQ).

The interrupt logic also includes a priority encoder 58 which determines the lowest-numbered processor among those processors which have a quiesce request pending. This number is compared to the processor number of this processor (here #1) and if they match then a separate "quiesce priority granted" signal is sent to the instruction unit 16 for use as a millicode branch condition (label QUPRIO).

In the event of a hardware error, all bits of the quiesce request register 56 are set to '0' as part of the hardware retry sequence. The millicode control register bit 52 indicating whether this processor is quiesced is preserved unchanged. Successful system recovery from a hardware error detected during a quiesce operation uses the following millicode sequences.

In addition to the hardware specifically related to quiesce operations, this design depends on the "retry trap" mechanism disclosed in the aforementioned copending application PO9-94-054. This retry trap provides a means for millicode to detect that hardware retry has been performed within a specific interval in the millicode sequence. The retry trap has a system register bit which is set to '1' whenever hardware retry is performed. This trap may be both read and written by millicode. This bit is sent to the instruction unit 16 for use as a millicode branch condition (label IRETRY).

Figure 3:
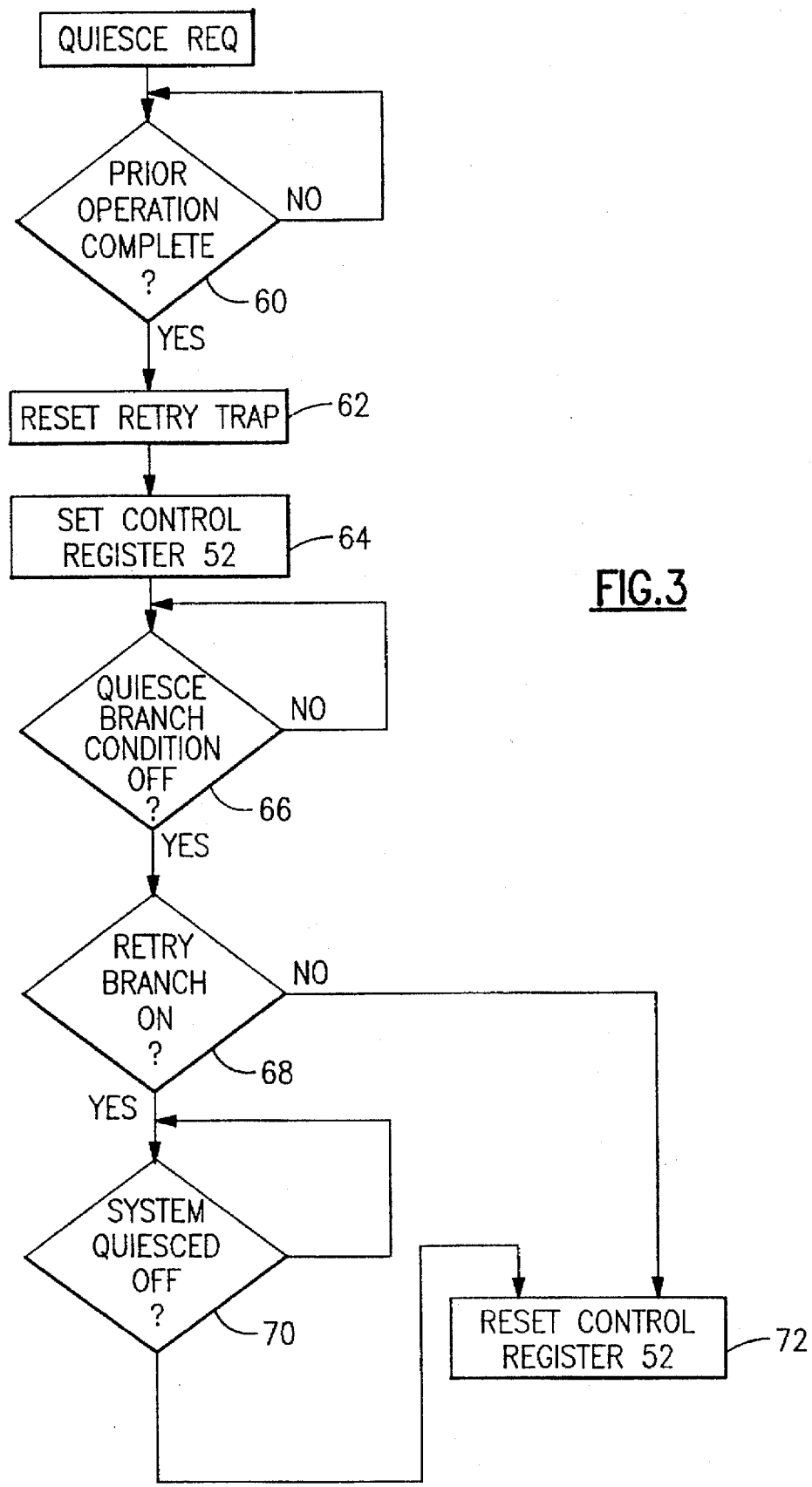
FIG. 3 is a flow diagram of a millicode routine for handling a quiescent interrupt.
Figure 4:
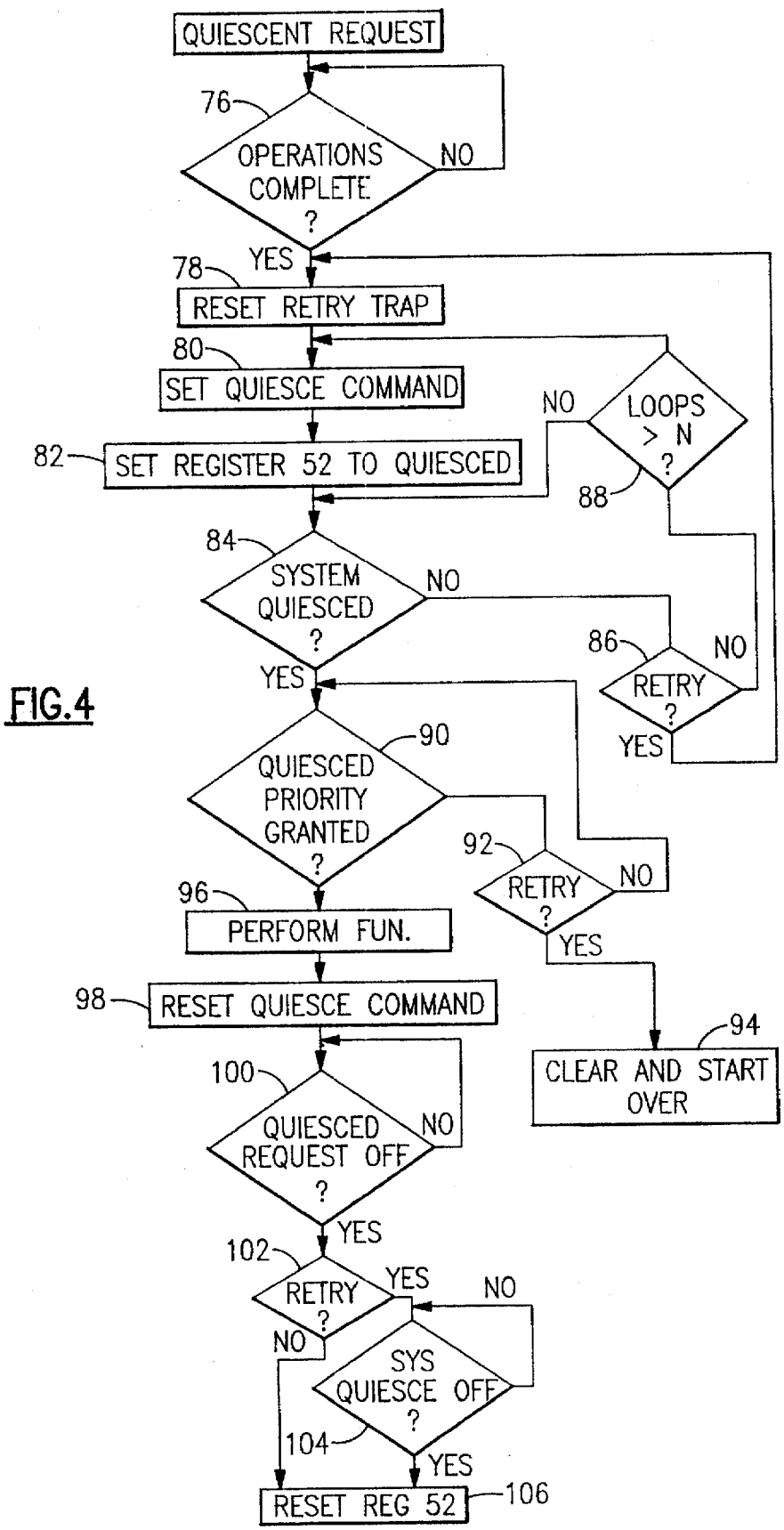
FIG. 4 is a flow diagram of a millicode routine for handling a quiescent interrupt requiring a quiesced system.

FIGS. 3 and 4 are flow diagrams of millicode sequences for handling a quiesce interrupt and for performing an operation requiring a quiesced system.

Referring now to FIG. 3, a quiesce interrupt occurs when a quiesce request is pending from one or more processors in the system and this processor is at an interruptible point. This interrupt condition is indicated by the millicode via the interrupt type and the quiesce request pending branch condition.

The millicode sequence for this case is as follows:

1. Wait until all prior operations complete, including line fetches, block 60.
2. Reset the retry trap latch to '0', block 62.
3. Set millicode control register 52 bit to '1' to indicate a "quiesced" state, block 64.
4. Loop until quiesce request pending branch condition is off, block 66.
5. If retry branch is on, block 68, then:
   a. Loop until system quiesced branch condition is off, block 70. This insures that exit from the quiesced state is initiated by a processor that has not gone through retry during the quiesce operation. In the extremely unlikely event that all processors go through retry in this interval, the system will hang up.
6. Reset millicode control register 52 bit to '0' to indicate that this processor is no longer quiesced, block 72.

Referring now to FIG. 4, certain so-called "broadcast" operations require all processors in the system to first enter the "quiesced" state, then perform the specific operation. In addition, the millicode routine must allow for the possibility that other processors are attempting such operations at the same time, so the priority scheme described above in FIG. 2 must be used. Once a processor has quiesce priority, it keeps that priority until it resets its quiesce request.

The sequence is as follows:

1. Wait until all prior operations complete, including line fetches, block 76.
2. Reset the retry trap latch to '0', block 78.

3. Issue set quiesce command, block 80.
4. Set millicode control register 52 bit to '1' to indicate a "quiesced" state, block 82.
5. In block 84, loop until quiesced system branch condition is on. This portion of the algorithm covers the cases of retry in this processor and in one of the other processors while entering the quiesced state.
   a. In loop, test retry branch condition, block 86.
   b. If retry is on, return to step 2.
   c. If waiting in this loop (block 88) for more than a predetermined number (N) of cycles, return to step 3. This covers for the possibility that a processor lost the set quiesce request due to hardware retry.
6. Loop until quiesced priority granted branch condition is on, block 90.
   a. In the loop, test retry branch condition, block 92. This portion of the algorithm covers the cases of retry in this processor while another processor had quiesce priority. Since this should be a very rare event (concurrent quiesce operations and retry) so that performance is not a concern, the safest course is to clear the state and start over, block 94, i.e. (1) issue reset quiesce command; (2) loop until QUSYS branch condition is off; and (3) return to step 2.
7. Perform function requiring quiesced state, block 96, and reset quiesce command, block 98.
8. Loop until quiesce request branch condition is off, block 100.
9. Then, if the retry branch condition is on, block 102;
   a. Loop until system quiesce branch condition is off. This insures that exit from the quiesced state is initiated by a processor that has not gone through retry during the quiesce operation. In the extremely unlikely event that all processors go through retry in this interval, the system will hang up.
10. Finally, reset millicode control register 52 bit to '0' to indicate that this processor is no longer quiesced, block 106, and continue with normal millicode operation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a pipelined computer processor, which executes a simple instruction set in a hardware controlled execution unit and executes a complex instruction set in a milli-mode architected state with a millicode sequence of simple instructions in said hardware controlled execution unit, a milli-mode method for responding to a quiesce request in a system including a plurality of processors each capable of generating a quiesce request, including the steps of:

setting a quiesce request register in each of said plurality of processors to indicate receipt of a quiesce request from one or more of said plurality of processors;

setting a system retry latch to indicate a processor in the system is executing a millicode sequence in response to a quiesce request;

setting a millicode control register in a processor to a quiesce state for that processor after an operation in execution prior to a quiesce request is complete;

setting a system quiesce register to indicate when each of said plurality of processors in the system are quiesced;

maintaining said quiesce state of a processor until the quiesce request register is reset to indicate all quiesce requests have terminated, if said system retry latch is not reset; and maintaining said quiesce state of a processor until its system quiesce register is reset if said retry latch is reset.

2. A milli-mode method for issuing and for prioritizing a quiesce request from a processor in a system including a plurality of processors each capable of generating a quiesce request, including the steps of:

a. setting a system retry latch to indicate a processor is executing a millicode sequence in issuing the quiesce request;
   b. setting a quiesce command register in each processor;
   c. setting a millicode control register in a processor to indicate the processor has entered a quiesced state;
   d. maintaining said quiesced state of each processor until a system quiesced register indicates all processors in the system are quiesced and the millicode control register indicates this processor has priority, unless the system retry latch is reset, in which case the process returns to step a.;
   e. performing the function requiring system quiesced;
   f. resetting the quiesce command register;
   g. resetting the millicode control register to indicate the processor has left the quiesce state unless the system retry latch is reset, in which case this step g. is carried out after the system quiesced register indicates all processors have left the quiesced state.

3. A milli-mode method for issuing and for prioritizing a quiesce request from a processor in a system including a plurality of processors each capable of generating a quiesce request, including the steps of:

a. setting a system retry latch to indicate a processor is executing a millicode sequence in issuing the quiesce request;
   b. setting a quiesce command register in each processor;
   c. setting a millicode control register in a processor to indicate the processor has entered a quiesced state;
   d. maintaining said quiesced state of each processor until a system quiesced register indicates all processors in the system are quiesced and the millicode control register indicates this processor has priority, unless the system retry latch is reset, in which case the process returns to step a. or the system quiesced register has not indicated, within a predetermined interval, all processors in the system are quiesced, in which case the process returns to step b.;
   e. performing the function requiring system quiesced;
   f. resetting the quiesce command register;
   g. resetting the millicode control register to indicate the processor has left the quiesce state unless the system retry latch is reset, in which case this step g. is carried out after the system quiesced register indicates all processors have left the quiesced state.

* * * * *